United States Patent
Izawa et al.

(10) Patent No.: US 6,954,562 B2
(45) Date of Patent: Oct. 11, 2005

(54) MATRIX SWITCH OF OPTICAL WAVEGUIDE TYPE AND METHOD FOR MANUFACTURING THE SAME

(75) Inventors: Tatsuo Izawa, Tokyo (JP); Katsuhiko Kurumada, Kanagawa (JP); Toshiaki Tamamura, Kanagawa (JP); Makoto Sato, Ibaraki (JP); Katsunari Okamoto, Ibaraki (JP)

(73) Assignee: NTT Electronics Corporation, Tokyo (JP)

( * ) Notice: Subject to any disclaimer, the term of this patent is extended or adjusted under 35 U.S.C. 154(b) by 0 days.

(21) Appl. No.: 10/755,388

(22) Filed: Jan. 13, 2004

(65) Prior Publication Data

US 2004/0141679 A1 Jul. 22, 2004

Related U.S. Application Data

(63) Continuation of application No. PCT/JP02/07128, filed on Jul. 12, 2002.

(30) Foreign Application Priority Data

Jul. 13, 2001 (JP) .......................................... 2001-213982

(51) Int. Cl.[7] ................................................. G02B 6/35
(52) U.S. Cl. ............................... 385/17; 385/18; 385/19
(58) Field of Search ...................................... 385/16–24

(56) References Cited

U.S. PATENT DOCUMENTS

| 6,195,478 | B1 | * | 2/2001 | Fouquet | 385/17 |
| 6,493,480 | B1 | * | 12/2002 | Lelic | 385/17 |
| 6,587,626 | B2 | * | 7/2003 | Beguin et al. | 385/125 |

FOREIGN PATENT DOCUMENTS

| JP | 04255804 A | * | 9/1992 | G02B/6/12 |
| WO | WO 00/25160 A1 | | 5/2000 | |
| WO | WO 200165292 A1 | * | 9/2001 | G02B/6/35 |

* cited by examiner

Primary Examiner—Michelle R. Connelly-Cushwa
(74) Attorney, Agent, or Firm—Venable LLP; Michael A. Sartori; Daniel G. Vivarelli, Jr.

(57) ABSTRACT

A matrix switch of an optical waveguide type which has low transmission loss variations and includes uniform grooves with a deep vertical cross section is provided. A switching part for selecting between a light path extending from an input port of a first set of optical waveguides $11_1$–$11_m$ to an output port of the first set of optical waveguides $11_1$–$11_m$ and a light path extending from an input port of the first set of optical waveguides $11_1$–$11_m$ to an output port of a second set of optical waveguides $12_1$–$12_n$ is arranged for insertion into a switching groove arranged at each of the intersections of the first set of optical waveguides $11_1$–$11_m$ and the second set of optical waveguides $12_1$–$12_n$. Each of the switching grooves is arranged on an imaginary straight line connecting intersections of the first set of optical waveguides $11_1$–$11_m$ and the second set of optical waveguides $12_1$–$12_n$.

4 Claims, 6 Drawing Sheets

MATRIX SWITCH OF OPTICAL WAVEGUIDE TYPE AND METHOD FOR MANUFACTURING THE SAME

This application claims priority from Japanese Patent Application Nos. 2001-213982 filed Jul. 13, 2001, which is incorporated hereinto by reference. In addition, this application is a continuation application of International Application No. PCT/JP02/07128 filed Jul. 12, 2002 designating the U.S.

BACKGROUND OF THE INVENTION

1. Field of the Invention

The present invention relates to a matrix switch of an optical waveguide type and a method for manufacturing the same and, more specifically, to a matrix switch of an optical waveguide type constituting a matrix switch comprising a uniform groove having a deep vertical cross section and with low transmission loss variations, and a method for manufacturing the same.

2. Description of the Related Art

In recent years, by virtue of the development of optical communications network, there is a large variety of digital information transmitted via optical fibers so that it is envisaged to diversify the pertinent services and upgrade the relevant networks. Under these circumstances, there is an increased need for optical switches and also for large-scale optical switches.

As a typical optical switch, a matrix switch of a bubble type is known. Given the number of inputs and outputs as m and n, respectively, in the bubble type matrix switch, m mutually parallel optical waveguides and n mutually parallel optical waveguides intersect and at each of the intersections a groove is formed, the core portion of mutually intersecting optical waveguides being cut. The grooves are filled with a matching oil having the same refractive index as that of the optical waveguide so that light can pass therethrough. Below the groove, a heater is provided so that bubbles can be created in the groove by heating. Since the refractive index is changed abruptly at the bubble and the matching oil interface plane, light will be totally reflected there. By adjusting the angle of the totally reflected light it is possible to make the light pass through a desired optical waveguide.

Conventionally, for a matrix switch, quartz glass is used that can realize a waveguide with low transmission loss. Quartz glass ($SiO_2$) is dry-etched with a CHF-based gas. However, since the bond energy of Si—O is large, a large amount of energy is necessary for active species to break the bond, and main species contributing to the etching are ions capable of being accelerated through electrical voltage. In dry-etching to which ions mainly contribute, there has been a problem that, since a direction of acceleration voltage affects significantly the shape of etching, in a narrow groove with high aspect ratio, the sidewall acts as shadow to reduce the number of ions reaching the bottom, resulting in decrease of the etching velocity.

Further, due to the sidewall's shadowing effect, the bottom of the groove is not uniformly irradiated with ions and the cross section contour tends to be tapered. Furthermore, there has been a problem that when the proportion of the parts to be etched exceeds that of the parts being masked, the amount of ions reaching the bottom of the groove differentiates, causing the etching to tend to be non-uniform. Therefore, conditions for etching must be necessarily controlled accurately, resulting in decreased throughputs, as well as device functionalities and increased device costs.

The object of the present invention is to provide a matrix switch of an optical waveguide type with low transmission loss variations comprising uniform grooves with a deep vertical cross section and a method for manufacturing a matrix switch of an optical waveguide type for forming uniform grooves economically.

DISCLOSURE OF THE INVENTION

To achieve the above objective, the present invention provides a matrix switch of an optical waveguide type comprising a first set of m mutually parallel optical waveguides arranged on a substrate, a second set of n mutually parallel optical waveguides intersecting the first set of optical waveguides and arranged on the substrate (m and n are integers), and switching grooves for switching between light paths each arranged at each of the intersections of the first and second sets of optical waveguides, characterized in that a switching part for selecting either one of a light path extending from an input port of the first set of optical waveguides to an output port of the first set of optical waveguides and a light path extending from an input port of the first set of optical waveguides to an output port of the second set of optical waveguides is provided, the switching part being an insertion plate having a reflective surface arranged for insertion into each of the switching groove, and that each of the switching grooves is arranged on an imaginary straight line connecting the intersections of the first and second sets of optical waveguides and filled with a liquid having a refractive index matching with that of the optical waveguide.

In addition, it may be also possible to arrange an area of deep grooves approximately as deep as the switching grooves or an area of deep grooves deeper than the switching grooves in an area other than the optical waveguides on a substrate.

Furthermore, it may be also possible to provide a first set of dummy grooves transmitting light and being arranged at any of the input ports of the first set of optical waveguides, a second set of dummy grooves transmitting light and being arranged at any of the output ports of the first set of optical waveguides, and a third set of dummy grooves transmitting light and being arranged at any of the output ports of the second set of optical waveguides, wherein each of the dummy ports is arranged on an imaginary straight line connecting intersections of the first and second sets of optical waveguides and filled with a liquid having a refractive index matching with that of the optical waveguide.

Preferably, the dummy grooves are arranged such that an optical signal incident on an input port of the first set of optical waveguides passes through m+n−1 grooves before outputting from an output port of the first set of optical waveguides or an output port of the second set of optical waveguides.

According to the invention, it may be possible to keep an insertion loss below a certain level, which is incurred at the groove part in a transmission state and affects the loss properties when the scale of the switch is expanded. Besides, it may be possible to manufacture narrow grooves with a deep vertical cross section uniformly and economically.

BEST MODE FOR CARRYING OUT THE INVENTION

Hereinafter, an embodiment of the invention will be described in detail with reference to the accompanying drawings. In the embodiment, a matrix switch of a mirror type is described, wherein switching is performed by inserting a mirror in a groove filled with a matching oil.

Figure 1:
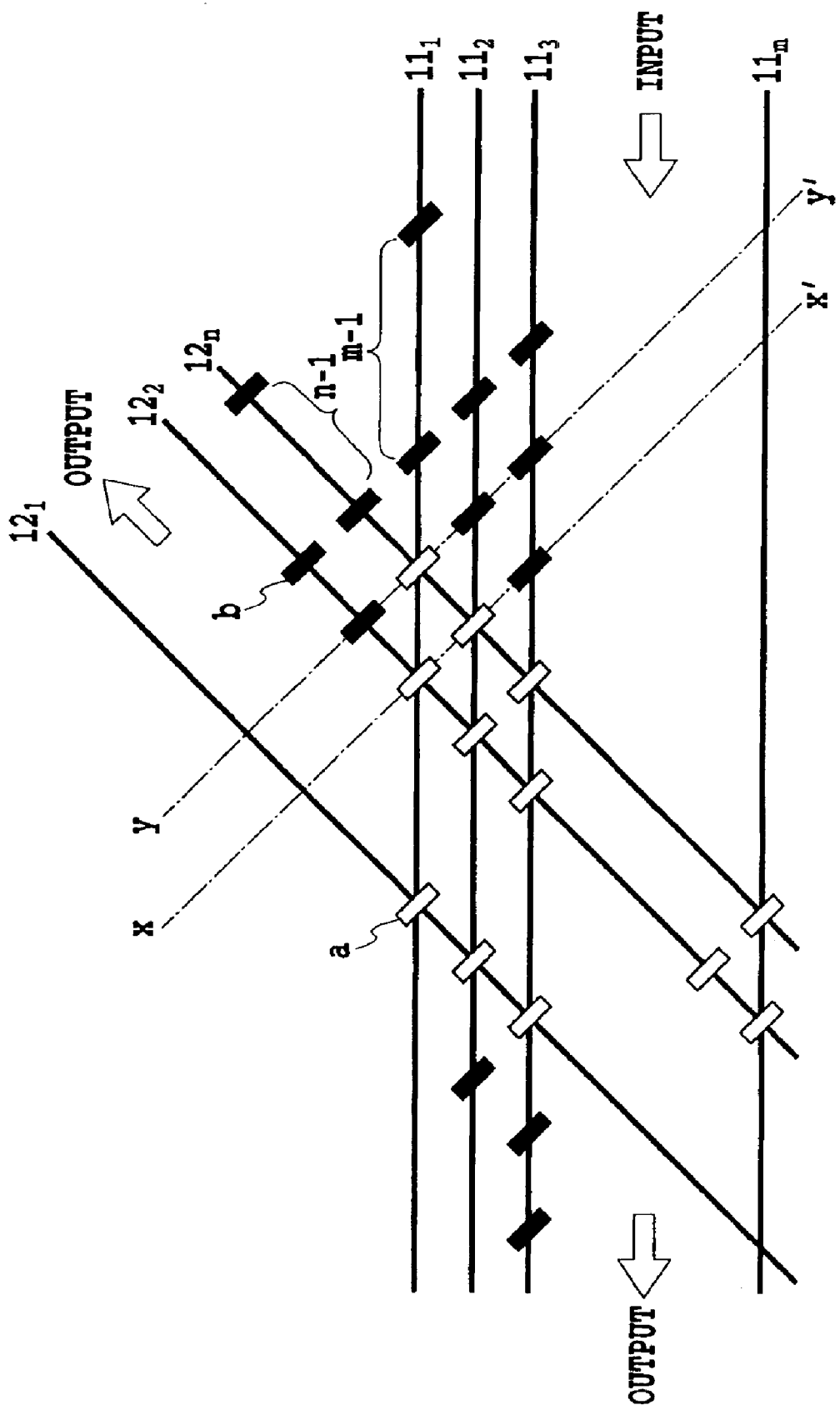
FIG. 1 is a constructional diagram showing a matrix switch of an optical waveguide type according to an embodiment of the invention.

FIG. 1 shows a matrix switch of an optical waveguide type according to an embodiment of the invention. It is assumed that the number of inputs and outputs of the matrix switch of an optical waveguide type be m and n, respectively. In the matrix switch of an optical waveguide type, m mutually parallel optical waveguides $11_1$–$11_m$ and n mutually parallel optical waveguides $12_1$–$12_n$ intersect and each of the intersection sites is provided with a switching groove (a). Further, dummy grooves (b) are provided on the input and output sides of the optical waveguides $11_1$–$11_m$ as well as on the output side of the optical waveguides $12_1$–$12_n$.

In the embodiments, the switching grooves (a) are filled with a matching oil so that light can transmit therethrough. The matching oil is a liquid whose refractive index matches with that of the optical waveguides. When changing the light path, an insertion plate having a reflective surface (mirror) will be inserted into the switching groove (a). When the insertion plate is inserted, a signal light incident from the input port of the optical waveguide $11_1$, for example, will be reflected by the insertion plate inserted in the switching groove (a) and output from the output port of the optical waveguide $12_1$.

Dummy grooves (b) also are filled with matching oil, but are not inserted with insertion plates and hence always are in a light transmitting state. Of dummy grooves (b), m−1 are provided at the input port of the optical waveguide $11_1$, m−2 at the input port of the optical waveguide $11_2$ and, decreasing sequentially one by one, one dummy groove is provided at the input port of the optical waveguide $11_{m-1}$. No dummy groove (b) is provided at the input port of the optical waveguide $11_m$. Further, one dummy groove (b) is provided at the output port of the optical waveguide $11_2$, two are provided at the output port of the optical waveguide $11_3$ and, increasing sequentially one by one, n−1 dummy grooves are provided at the output port of the optical waveguide $11_n$. On the other hand, one dummy groove (b) is provided at the output port of the optical waveguide $12_2$, two are provided at the output port of the optical waveguide $12_3$ and, increasing sequentially one by one, n−1 dummy grooves (b) are provided at the output port of the optical waveguide $12_n$.

By virtue of such a structure, the number of grooves through which light passes is equally m+n−1, whether light passes through any pathway extending from the input ports of the optical waveguides $11_1$–$11_m$ to the output ports of the optical waveguides $11_1$–$11_m$ or light passes through any pathway from the input ports of the optical waveguides $11_1$–$11_m$ to the output ports of the optical waveguides $12_1$–$12_n$, and the transmission loss variation due to the selection of the light path can be significantly reduced.

Next, a concrete example for the size of the grooves will be described hereinafter. The narrower the width of a groove is, the smaller the transmission loss becomes at the groove. The capacity of a practical matrix switch of an optical waveguide type will now be considered with reference to three cases of different capacities, that is, m×n=32×32, 64×64 and 128×128. The number of grooves through which light passes is 63, 127 and 255, respectively, and the number of grooves transmitting light is 62, 126 and 254, respectively. When applying a matrix switch of an optical waveguide type to an optical fiber network, the total insertion loss of the switch is desirably 10 dB or lower. The total insertion loss includes input/output coupling loss due to coupling of switches and optical fibers, transmission loss at the groove part in a reflection state, etc. Since these losses total as much as several dB, the permissible loss at the groove in a transmitting state is required to be at least 10−3=7 dB or lower. Therefore, depending on the switch capacity, the permissible transmission loss at a groove at one location is as follows:

m×n=32×32:7/63=0.11 dB m×n=64×64:7/127=0.06 dB m×n=128×128:7/255=0.03 dB

Figure 2:
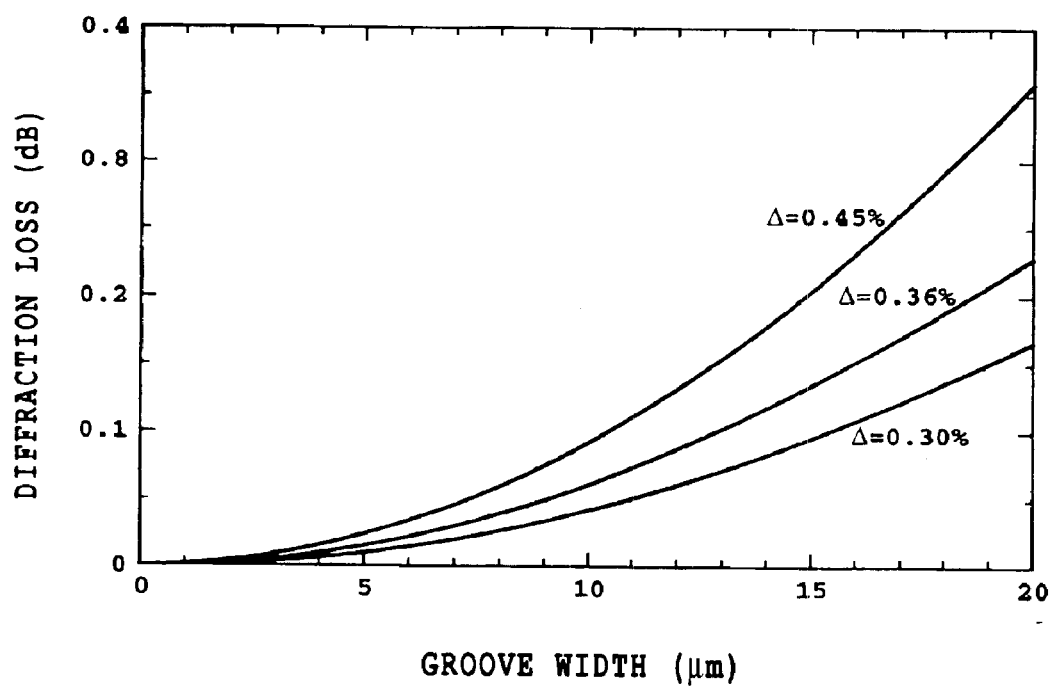
FIG. 2 is a diagram showing the relation between the width of the grooves and the light loss.

FIG. 2 shows the relation between the groove width and the light loss, wherein the relation between the groove width and the diffraction loss when the specific refractive index difference Δ A is changed, is represented. In the case of a standard optical waveguide with the core size of 7 μm×7 μm, Δ=0.45%. Decreasing the specific refractive index to reduce the loss (core size 8 μm×8 μm) results in Δ=0.36%, 0.30%. In the case of Δ=0.30% as shown in FIG. 2, to realize the above transmission loss, the effective groove width as seen from the incidence direction of light beam is as follows:

m×n=32×32:ca. 15 μm (0.11 dB)

m×n=64×64:ca. 12 μm (0.06 dB)

m×n=128×128:ca. 10 μm (0.03 dB)

As described above, forming such a narrow and deep groove by etching incurs a problem that the uniformity of the shape and depth of the groove cannot be maintained. In view of this, as shown in FIG. 1, each of the optical waveguides and the grooves is arranged such that both of switching grooves (a) and dummy grooves (b) are aligned on a straight line, i.e., on an imaginary straight line (shown as dot-dash lines x–x', y–y') connecting intersections of the optical waveguides $11_1$–$11_m$ and $12_1$–$12_n$. Thus, each of switching grooves (a) and dummy grooves (b) can be formed through rotational cutting with dicing saw.

By this method, it is possible to reduce the number of addressing operations made by a cutting edge, therefore it is possible to make a cumulative error at the time of addressing small and to shorten the time for forming the grooves. Moreover, by using a cutting edge, it is possible to avoid tapering and hence form easily the switching grooves (a) and the dummy grooves (b) with the shape and depth of the grooves being constant.

However, commercially available thin cutting edges for dicing saw are only those as thick as about 15–20 μm. A very thin cutting edge for cutting 10 μm wide grooves is custom-made. Such a cutting edge is prone to go rapidly dull and, accordingly, frequent exchange of this part will be necessary. Therefore, it is not economical.

Figure 3:
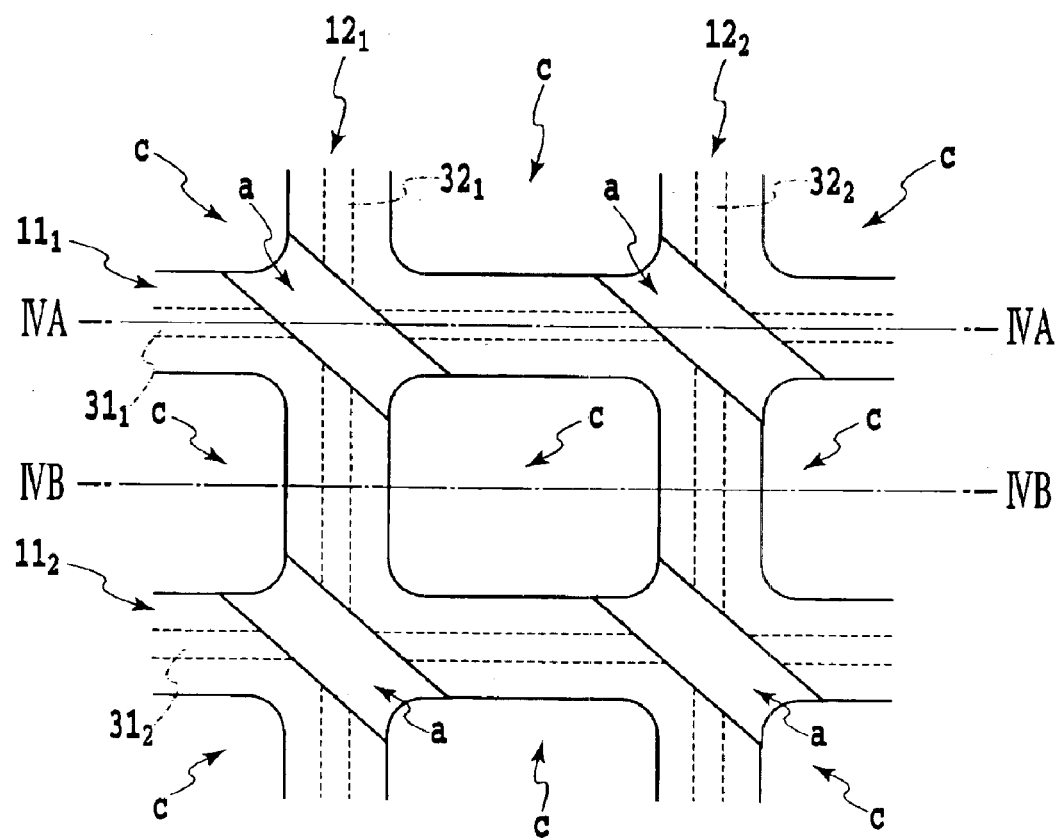
FIG. 3 is a plan view showing the structure of the matrix switch of an optical waveguide type according to an embodiment of the present invention.

FIG. 3 shows the structure of a matrix switch of an optical waveguide type according to an embodiment of the invention. The less the cutting volume is, the less a cutting edge goes dull. In view of this, to reduce the area being rotationally cut by a cutting edge, deep grooves (c) are provided on the periphery of the optical waveguides. The depth of the area of deep grooves (c) is approximately equal to or deeper than the depth being cut by a cutting edge. On the other hand, switching grooves (a) have sufficient depth for each of the cores $31_1$, $31_2$, $32_1$ and $32_2$ of the optical waveguides $11_1$, $11_2$, $12_1$ and $12_2$ to be cut.

Thus, when a cutting edge is applied to cut switching grooves (a) at intersections of the optical waveguides $11_1$, $11_2$, $12_1$ and $12_2$, it may be possible to minimize consumption of the cutting edge by reducing the cutting volume of the cutting edge through formation of deep grooves (c) in advance.

Figure 4A:
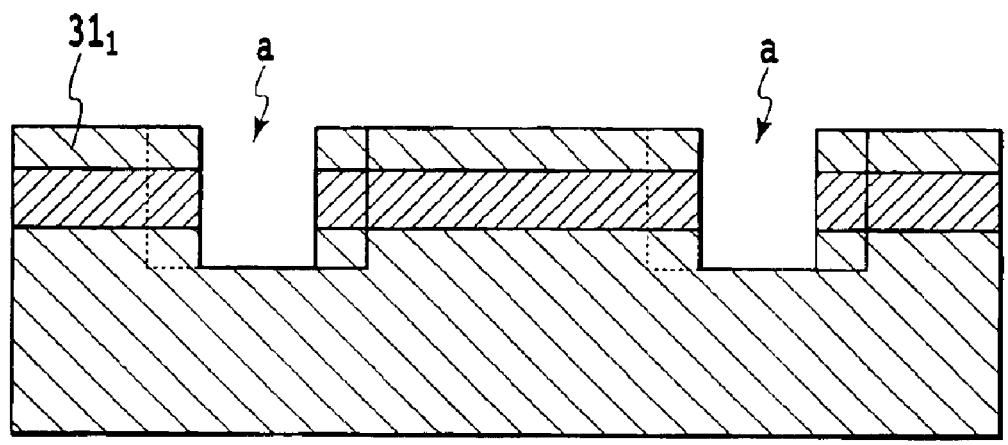
FIGS. 4A and 4B are cross sectional views showing the structure of the matrix switch of an optical waveguide type according to an embodiment of the invention.
Figure 4B:
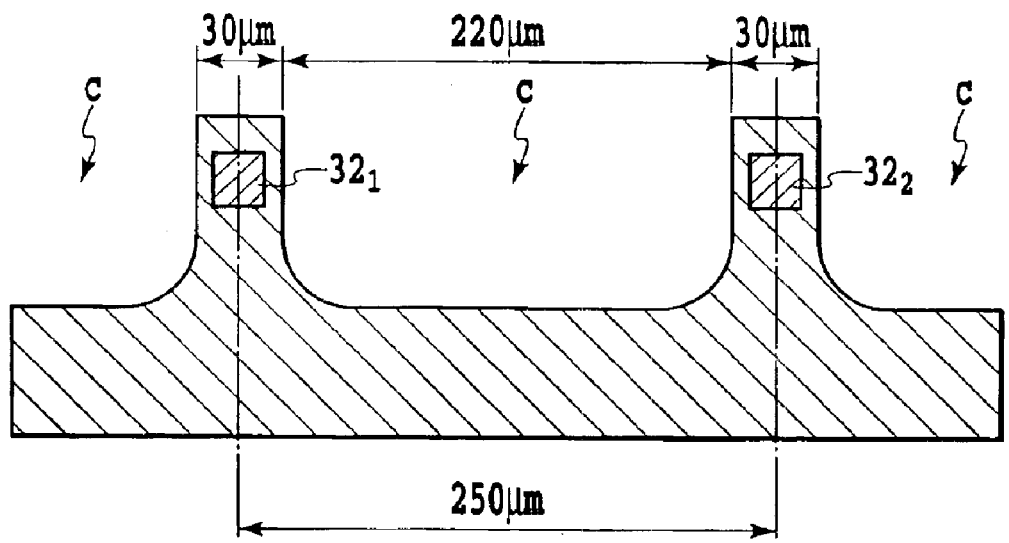

FIG. 4A shows a section view of a matrix switch of an optical waveguide type of FIG. 3 taken along the line IVA—IVA. FIG. 4B shows a section view of a matrix switch of an optical waveguide type of FIG. 3 taken along the line IVB—IVB. The distance between the optical waveguides is 250 μm when the optical fibers connected thereto are most densely arranged side by side. Since the width of 30 μm is sufficient for each of the cores $31_1$, $31_2$, $32_1$ and $32_2$ of the optical waveguides $11_1$, $11_2$, $12_1$ and $12_2$ as well as for the clad area, it may be possible to provide the deep grooves (c) with the width of 220 μm.

As a result, the ratio of switching grooves (a) or dummy grooves (b) to the deep grooves (c) is 12:88. Therefore, the working life of a cutting edge could be improved to approximately 88/12 as compared to the case without deep grooves (c). Incidentally, the deep grooves (c) can be either formed as a single wide area or as small divided areas.

Figure 5:
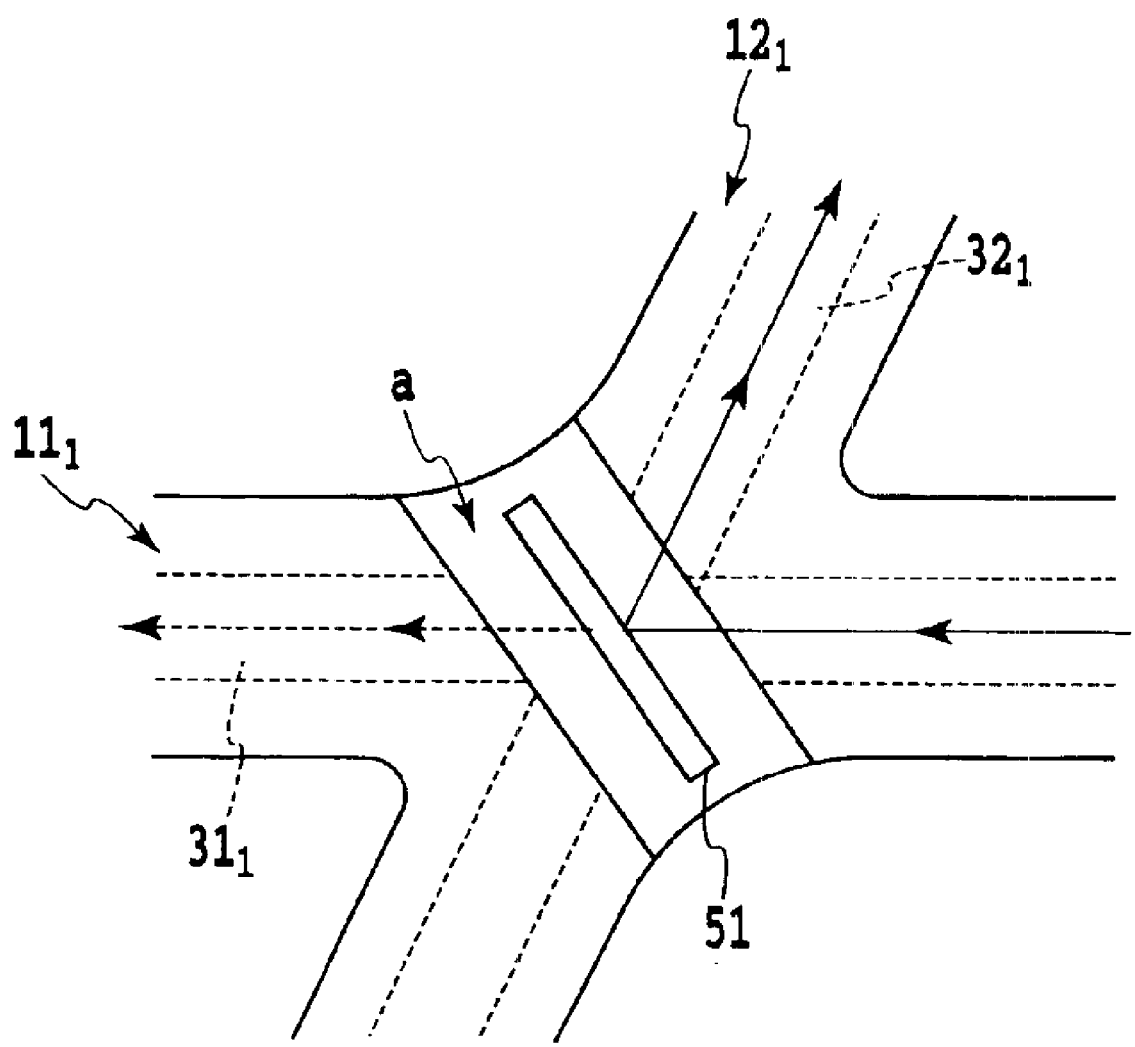
FIG. 5 is a diagram illustrating the operations of the matrix switch of an optical waveguide type according to an embodiment of the invention.

With reference to FIG. 5, the operation of a matrix switch of an optical waveguide type according to an embodiment of the invention will be described hereinafter. FIG. 5 is an enlarged view of the intersection of optical waveguides $11_1$ and $12_1$ of FIG. 3. An insertion plate 51 having a reflective surface will be inserted into the switching groove (a) in the light pass by a vertical movement or a parallel displacement along the switching groove (a) of the insertion plate 51. When the insertion plate 51 is inserted, the light beam input into the core $31_1$ of the optical waveguide $11_1$ will be output into the core $32_1$ of the optical waveguide $12_1$ as represented by the full line. When the insertion plate 51 is not inserted, the light beam input into the core $31_1$ of the optical waveguide $11_1$ will directly go straight through the core $31_1$ of the optical waveguide $11_1$ and output therefrom, as represented by the dotted line.

For example, it may be possible to move insertably the insertion plate 51 by using a cantilever as an actuator for the insertion plate 51.

Figure 6A:
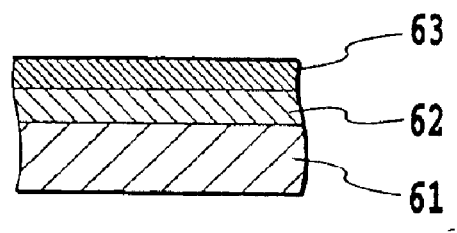
FIGS. 6A–6E are diagrams explaining a method for manufacturing a matrix switch of an optical waveguide type according to an embodiment of the invention.
Figure 6B:
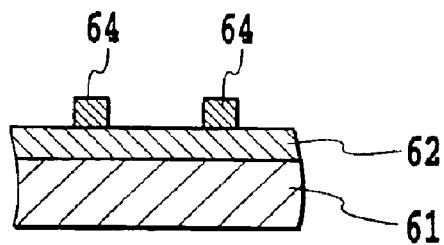
Figure 6C:
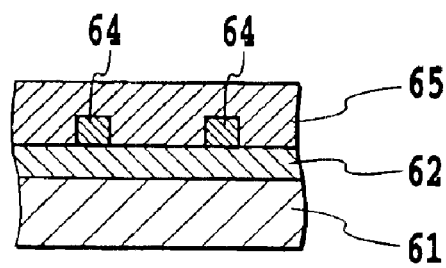
Figure 6D:
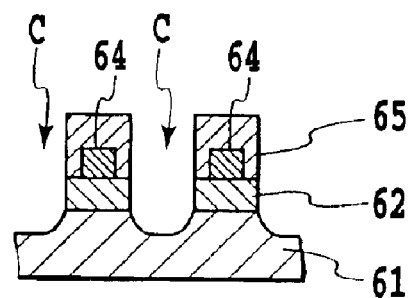

FIGS. 6A–6E show a method for manufacturing a matrix switch of an optical waveguide type according to an embodiment of the invention. In FIG. 6A, a quartz film 62 configured to constitute a lower clad and a quartz film 63 configured to constitute a core are sequentially deposited, and in FIG. 6B, optical waveguides 64 made of quartz are formed by photolithography. In FIG. 6C, the optical waveguides 64 are embedded into a quartz film 65 configured to constitute an upper clad. When forming optical waveguides made of quartz by photolithography, a positioning mark for showing a start position, stop position and a cutting direction should be formed at the same time for addressing the cutting edge performing rotational cutting.

Deep grooves (c) are formed by etching and switching grooves (a) and dummy grooves (b) are cut by a cutting edge 66. Positioning for cutting of switching grooves (a) and dummy grooves (b) is performed by using a monitor of an optical microscope. A dicing saw is placed on the positioning mark and the quartz film is cut to be a desired depth and length. Usually, the cutting edge of the dicing saw is adhered with hard particles around the circular circumference thereof, and rotates with high speed for cutting the optical waveguide while being supplied with liquid such as water.

Figure 6E:
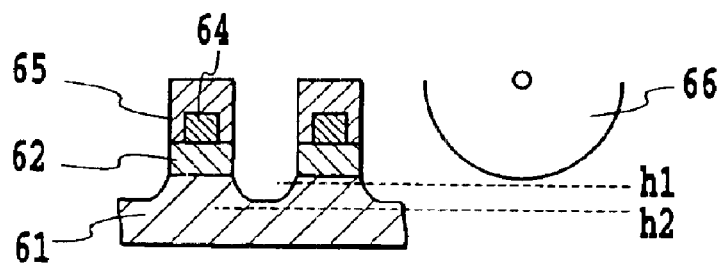

In this case, it is enough when the depth of switching grooves (a) or dummy grooves (b) to be achieved by the cutting edge of a dicing saw is approximately equal to the depth of the deep grooves (c), i.e., no strict preset accuracy is required. In FIG. 6E, when the depth to be cut by the cutting edge is at a position (h1) slightly shallower than the bottom of the deep groove (c), the cutting edge does not cut the area of the deep groove (c), therefore the cutting edge goes slightly dull. Also, when the depth to be cut by the cutting edge reaches a position (h2) slightly deeper than the bottom of the deep groove (c), the cutting edge cuts the area of the deep groove (c) only a little so that consumption of the cutting edge can be inhibited as much as possible.

According to the embodiment, grooves for switching of a matrix switch of an optical waveguide type having a size of m+n≦256 can be uniformly formed and economically provided. Moreover, the variation of the insertion loss at the groove portion in a transmitting sate can be inhibited.

Industrial Applicability

As described above, according to the invention, basic components for a matrix switch of an optical waveguide type, which is flexibly applicable in accordance with the enlarged scale of communication systems, can be provided.

What is claimed is:

1. A matrix switch of an optical waveguide type having a first set of m mutually parallel optical waveguides arranged on a substrate, a second set of n mutually parallel optical waveguides intersecting the first set of optical waveguides and arranged on said substrate (m and n are integers), and switching grooves for switching between light paths each arranged at each of the intersections of said first and second sets of optical waveguides, said matrix switch comprising:

a switching part for selecting either one of a light path extending from an input port of said first set of optical waveguides to an output port of said first set of optical waveguides and a light path extending from an input port of said first set of optical waveguides to an output port of said second set of optical waveguides is provided, said switching part being an insertion plate having a reflective surface and arranged for insertion into said switching groove; and an area of deep groves which is deeper than said switching grooves being arranged in an area other than said optical waveguides on said substrate, wherein each of said switching grooves is arranged on an imaginary straight line connecting intersections of said first and second sets of optical waveguides and filled with a liquid having a refractive index matching with that of said optical waveguide.

2. A matrix switch of an optical waveguide type comprising having a first set of m mutually parallel optical waveguides arranged on a substrate, a second set of n mutually parallel optical waveguides intersecting the first set of optical waveguides and arranged on said substrate (m and n are integers), and switching grooves for switching between light paths each arranged at each of the intersections of said first and second sets of optical waveguides, characterized in that said matrix switch comprising:

- a switching part for selecting either one of a light path extending from an input port of said first set of optical waveguides to an output port of said first set of optical waveguides and a light path extending from an input port of said first set of optical waveguides to an output port of said second set of optical waveguides is provided, said switching part being an insertion plate having a reflective surface and arranged for insertion into said switching groove; and
- a first set of dummy grooves transmitting light and being arranged at any of input port of said first set of optical waveguides, a second set of dummy grooves transmitting light and being arranged at any of output port of said first set of optical waveguides, and a third set of dummy grooves transmitting light and being arranged at any of output port of said second set of optical waveguides,
- wherein each of said switching grooves and said dummy grooves is arranged on an imaginary straight line connecting intersections of said first and second sets of optical waveguides and is filled with a liquid having a refractive index matching with that of said optical waveguide, and
- wherein each of said dummy grooves are arranged such that signal light incident into the input ports of said first set of optical waveguides passes m+n−1 grooves before outputting from the output ports of said first set of optical waveguides or said second set of optical waveguides.

3. A method for manufacturing a matrix switch of an optical waveguide type comprising a first set of m mutually parallel optical waveguides arranged on a substrate, a second set of n mutually parallel waveguides intersecting said first set of optical waveguides and arranged on said substrate (m and n are integers), and switching grooves for switching between light paths each arranged at each of the intersections of said first and second sets of optical waveguides, characterized by comprising:

- arranging an area for deep grooves with depth deeper than the depth rotationally cut by a cutting edge outside said optical waveguides on said substrate; and
- forming each of said switching grooves on said imaginary straight line by rotationally cutting an upper surface of said substrate, on which said first and second sets of optical waveguides have been formed, by said cutting edge.

4. The method for manufacturing a matrix switch of an optical waveguide type as claimed in claim 3, wherein said matrix switch of an optical waveguide type comprises a first set of dummy grooves transmitting light and being arranged at any of the input ports of said first set of optical waveguides, a second set of dummy grooves transmitting light and being arranged at any of the output ports of said first set of optical waveguides, and a third set of dummy grooves transmitting light and being arranged at any of the output ports of said second set of optical waveguides, and

- wherein said method further comprises forming each of said switching grooves and/or said dummy grooves on said imaginary straight line.

* * * * *